UNITED STATES PATENT OFFICE.

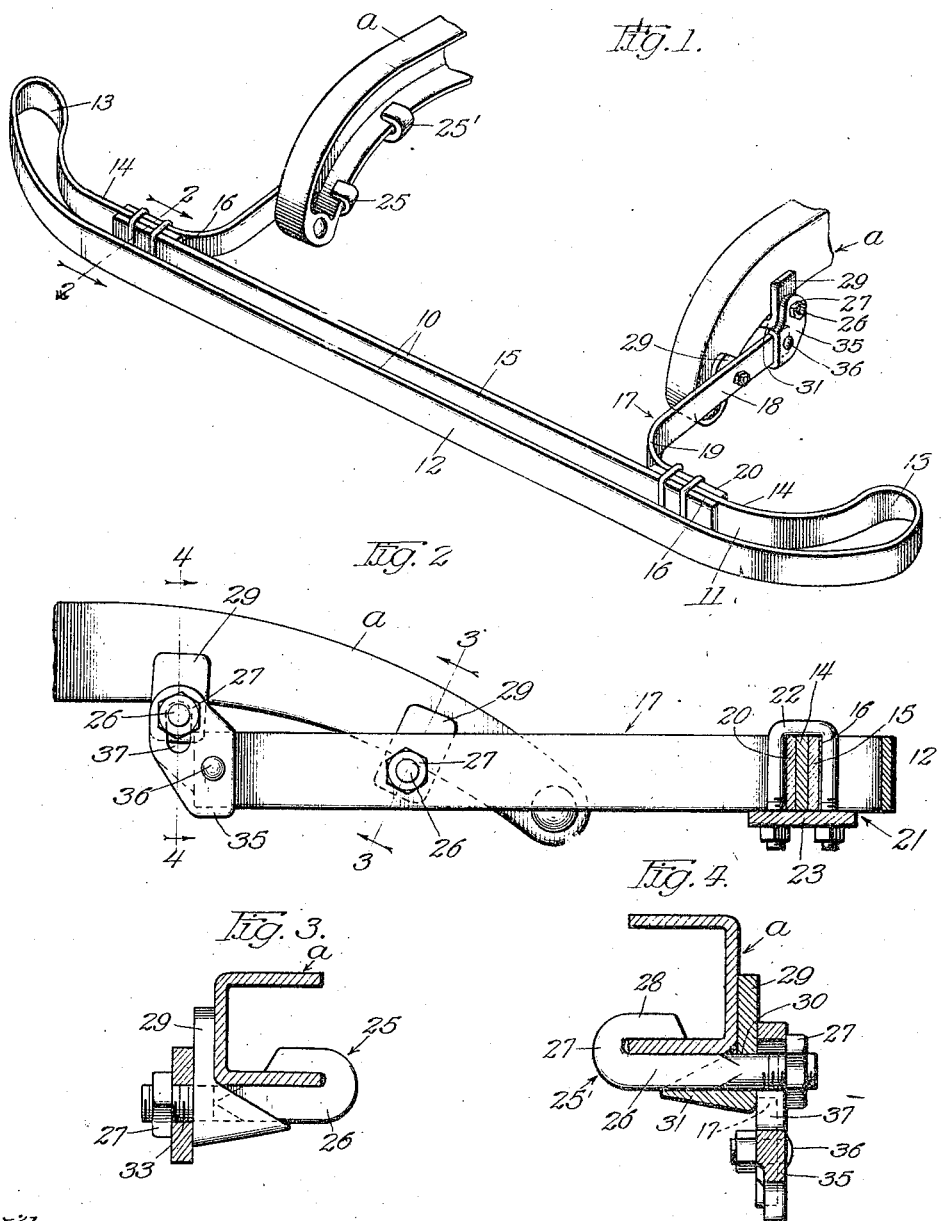

EDWARD PARRADEE, OF CHICAGO, ILLINOIS.

AUTOMOBILE-BUMPER.

1,277,749.

Specification of Letters Patent.  Patented Sept. 3, 1918.

Original application filed February 21, 1917, Serial No. 149,979. Divided and this application filed October 4, 1917. Serial No. 194,687.

*To all whom it may concern:*

Be it known that I, EDWARD PARRADEE, a citizen of the United States, residing at Chicago, in the county of Cook and State of Illinois, have invented certain new and useful Improvements in Automobile-Bumpers, of which the following is a specification.

My invention relates to automobile bumpers, and more particularly to an attachment device, for securing a bumper to any type of car.

One of the objects of the invention is to provide simplicity of construction for easy and economical manufacture, convenient adjustability and advantageous correlation of parts for ease of application to many makes of cars.

Still other and further objects will become readily apparent to those skilled in the art, from a consideration of the following description and drawing wherein:—

Figure 1 is a perspective view of the bumper applied to the front end of a motor car frame.

Fig. 2 is a sectional view on the line 2—2 of Fig. 1.

Fig. 3 is a sectional view on the line 3—3 of Fig. 2.

Fig. 4 is a sectional view on the line 4—4 of Fig. 2.

The transverse member or bar of the bumper, shown at 10, comprises a flat, steel band 11 of appropriate length bent to provide a front course or leaf 12 to extend the full width of the car, and at the sides thereof preferably to bow rearwardly, end curves or bends 13, preferably somewhat pear-shaped to avoid curvatures of weakeningly-short-radius and stubs 14 paralleling the front course 12, spaced a few inches apart therefrom, and terminating in confronting ends separated transversely by a distance somewhat more than the ordinary width of an automobile frame. A rear strap 15, kindred in material to the member 11 spans this gap and overlaps, as at 16, the contiguous ends of the stubs 14 for a distance (say six inches) sufficient to include the commercially expectable variation in width of automobile frames. When the overlapped ends are secured together, as hereinafter described, the bar 10 thus comprises a two-piece loop of a spring steel band having end curves integral with the front course of the loop, and its two courses, front and back, arranged in substantial parallelism with the relatively deep, narrow band edge-down.

The above described bar is supported on spring-supports 17, preferably of spring steel, each providing a straight leg 18, to extend in parallelism with the side frame of the car, a spring curve 19 at its outer end, and a foot 20 bent laterally outward to parallel the rear course of the bar and rest flat against the contiguous stub 14 thereof.

The seats 20 of the supports are adjustably clamped to the overlapped portion 16 of the rear course of the bar, and to this end, I provide in each clamp a pair of U-bolts 22 snugly embracing the triple ply of metal formed by the ends of the stub 14, strap 15 and foot 20, and at their lower ends passing through a plate 23 to be secured by the complemental nuts. It will be apparent that by this construction, the supporting legs 18 may be adjusted as to lateral separation through a range adequate to fit the bumper to cars of different frame widths.

The above described construction of the bumper bar itself forms the subject matter of my Patent No. 1,247,142 for automobile bumpers, granted November 20, 1917, from which the present application is a division.

The rear portion of each leg 18 is secured to the down-bending horn —a— of the side sill of the car frame preferably by front and rear clamps 25 and 25' that may be substantial duplicates in construction. Each clamp preferably comprises a stem 26 to receive a nut 27 at its outer end and thence extending preferably in broadened and flattened form adapted to lie flush against the under side of said frame channel to a U-bend 27 of a terminal hook 28, so that the hooked stem may embrace the sheet metal bottom flange of the channeled car frame member and bear against both the top and bottom thereof. Over the outer portion of the stem is slipped a clamp fitting 29 having a stem receiving opening 30 preferably underlain by a brace bearing plate 31 integral with the vertical course of the clamp and suitably shaped to coöperate with the squared portion of the stem. When the nut is screwed home to cause pressure to be exerted on the clamp member 29, the frame is very firmly and rigidly gripped between the jaw 29 and the hook 28. Each supporting leg has an opening 33 to receive the stem of the front clamp 25 by direct engagement, the leg lying between the bolt and the clamp jaw 29 as shown in Fig. 3. Owing, however, to the fact that the horn —a— of the machine is generally down-turned more or less, in order that the leg shall be level its rear extremity should be adjustable with respect to the rear clamp 25′. Accordingly I have fitted upon the extremity of leg 18 a bracket 35 anchored thereto as at 36, and extending upwardly above the leg 18, such bracket having therein a slot 37 to receive the stem of the rear clamp in such relation to the slot as will level the supporting leg horizontally.

It will be apparent that the construction described affords a very rigid anchorage of the bumper to the frame of the car and provides a bumper structure wherein the bar is formed of an effectively continuous loop.

While I have illustrated and described but a single embodiment of the invention, it will be apparent to those skilled in the art that various changes and modifications may be made therein, without departing from the spirit of the invention or the scope of the appended claims.

Having described my invention, what I claim is:—

1. In a bumper the combination of a bar, supporting arms extending rearwardly therefrom, and clamp means for securing said arms to the automobile frame, each said clamping means comprising a hook stem, a jaw member slidably mounted on the stem with one portion thereof overlying the outer side of the frame and another portion underlying the mid-portion of the stem arranged to force said mid-portion of the stem into intimate contact with the frame, and a nut for forcing said jaw member toward the hook.

2. In an automobile bumper, the combination of a transverse bar, supporting arms extending rearwardly therefrom, and clamping means for securing said arms to the automobile frame, each said clamping means comprising a hooked stem, having a flattened, hooked portion and a threaded extremity, a clamping jaw having a portion to oppose the hook and a portion to extend longitudinally under the flattened portion of the stem to force the latter into intimate contact with the frame, and a nut on the said stem for forcing said clamping jaw toward said hook and retaining the supporting member on the stem.

3. In an automobile bumper the combination of a transverse bar, supporting arms extending rearwardly therefrom, and clamping means for securing said supports to the automobile frame, said clamping means comprising a hooked stem positioned to underlie the automobile frame with the hook in engagement with the inner edge thereof, a clamping jaw of L-shaped cross-section positioned with its vertical leg abutting against the outer side of the frame and its horizontal leg extending under the frame, said jaw having an opening therein to receive the hooked stem whereby to force said stem into intimate contact with the under side of the frame, and a nut threaded on the outer end of the stem to force the clamping jaw toward the hook.

4. In a device of the character described, the combination with an angle bar frame member, of a stem, having one end bent upon itself to form a hook to closely fit one flange of the bar and to intimately contact the under surface of said flange; a perforate clamping fitting having a semi-cylindrical, underlying part closely fitting the under side of said stem and an integral vertical plate for contact with the inner face of the vertical flange of said bar; and a nut on the end of the stem to force the fitting and stem into intimate contact with said bar.

5. In combination with a bumper bar; supporting arms extending rearwardly thereof; a pivotal support for each said arm near the bar; an upwardly extending slotted bracket, secured to the rear end of each arm, and adjustable clamping means for securing the said rear ends to the automobile frame comprising a hook stem; a jaw member axially movable on the stem, with one portion thereof overlying the outer side of the frame and another portion underlying the mid-portion of the stem, arranged to force the mid-portion of the stem into intimate contact with the frame, said stem passing through the slot in said bracket; a nut on said stem bearing on said bracket to force said parts into intimate contact whereby to adjust the altitude of the respective ends of the bar.

In testimony whereof I hereunto set my hand.

EDWARD PARRADEE.